United States Patent
Sitze

(10) Patent No.: US 7,581,250 B2
(45) Date of Patent: Aug. 25, 2009

(54) SYSTEM, COMPUTER PROGRAM PRODUCT AND METHOD OF SELECTING SECTORS OF A HARD DISK ON WHICH TO PERFORM A VIRUS SCAN

(75) Inventor: Richard Alan Sitze, Round Rock, TX (US)

(73) Assignee: Lenovo (Singapore) PTE Ltd, Singapore (SG)

( * ) Notice: Subject to any disclaimer, the term of this patent is extended or adjusted under 35 U.S.C. 154(b) by 584 days.

(21) Appl. No.: 11/060,610

(22) Filed: Feb. 17, 2005

(65) Prior Publication Data

US 2006/0185016 A1   Aug. 17, 2006

(51) Int. Cl.
G06F 11/00 (2006.01)
G06F 12/14 (2006.01)
G06F 12/16 (2006.01)
G06F 7/04 (2006.01)
G06F 17/30 (2006.01)
H04N 7/16 (2006.01)
G06F 12/00 (2006.01)

(52) U.S. Cl. .............. 726/22; 726/23; 726/24; 726/25; 726/26; 713/188; 713/189; 713/193; 707/200; 707/201; 707/202; 707/203; 707/204; 707/205

(58) Field of Classification Search .............. 726/22–24
See application file for complete search history.

(56) References Cited

U.S. PATENT DOCUMENTS

| | | | |
|---|---|---|---|
| 5,367,682 A | 11/1994 | Chang | |
| 5,511,184 A | 4/1996 | Lin | |
| 5,649,095 A | 7/1997 | Cozza | |
| 5,657,473 A | 8/1997 | Killean et al. | |
| 6,021,510 A | 2/2000 | Nachenberg | |
| 6,067,618 A | 5/2000 | Weber | |
| 6,092,161 A | 7/2000 | White et al. | |
| 6,094,731 A * | 7/2000 | Waldin et al. | 714/38 |
| 6,268,789 B1 | 7/2001 | Diamant et al. | |
| 6,272,533 B1 | 8/2001 | Browne | |
| 6,324,627 B1 | 11/2001 | Kricheff et al. | |
| 6,526,488 B1 | 2/2003 | White et al. | |
| 6,535,891 B1 * | 3/2003 | Fisher et al. | 707/203 |
| 6,591,362 B1 | 7/2003 | Li | |
| 6,598,060 B2 * | 7/2003 | Goldick | 707/203 |

(Continued)

FOREIGN PATENT DOCUMENTS

EP    0560277 A1   9/1993

(Continued)

OTHER PUBLICATIONS

Goldberg, Robert P., A Survey of Virtual Machine Research, IEEE Computer, Jun. 1974, pp. 34-45, vol. 7, No. 6.

*Primary Examiner*—Shin-Hon Chen
(74) *Attorney, Agent, or Firm*—Volel Emile; Charlie Bustamante

(57) ABSTRACT

A system, computer program product and method of selecting sectors of a disk on which to perform a virus scan are provided. Initially, all data in all sectors of a disk is scanned for viruses. After the initial scan each sector into which new or modified data is written is recorded. This allows only new or modified data that has been added to the disk since a preceding scan to be scanned for viruses at a succeeding scan.

18 Claims, 4 Drawing Sheets

U.S. PATENT DOCUMENTS

| | | | |
|---|---|---|---|
| 6,735,700 B1 * | 5/2004 | Flint et al. | 726/24 |
| 6,763,466 B1 | 7/2004 | Glover | |
| 6,802,028 B1 | 10/2004 | Ruff et al. | |
| 6,928,555 B1 * | 8/2005 | Drew | 726/24 |
| 7,058,667 B2 * | 6/2006 | Goldick | 707/203 |
| 7,058,975 B2 * | 6/2006 | Edwards et al. | 726/22 |
| 7,069,594 B1 * | 6/2006 | Bolin | 726/26 |
| 7,134,006 B2 | 11/2006 | Flanigan | |
| 7,188,367 B1 * | 3/2007 | Edwards et al. | 726/24 |
| 7,216,366 B1 * | 5/2007 | Raz et al. | 726/24 |
| 2002/0073055 A1 | 6/2002 | Chess et al. | |
| 2002/0169987 A1 | 11/2002 | Meushaw et al. | |
| 2003/0074574 A1 | 4/2003 | Hursey et al. | |
| 2003/0120952 A1 | 6/2003 | Tarbotton et al. | |
| 2004/0117401 A1 * | 6/2004 | Miyata et al. | 707/104.1 |
| 2004/0158730 A1 | 8/2004 | Sarkar | |
| 2004/0268079 A1 | 12/2004 | Riedle et al. | |
| 2006/0021032 A1 | 1/2006 | Challener et al. | |
| 2006/0021041 A1 | 1/2006 | Challener et al. | |

FOREIGN PATENT DOCUMENTS

| | | |
|---|---|---|
| EP | 1056010 A1 | 11/2000 |
| JP | 9138733 | 5/1997 |

* cited by examiner

| COUNTER VALUES | LOCATIONS ON DISK |
|---|---|
| 1 | 3 |
| 2 | 4 |
| 3 | 1 |
| 4 | 5 |
| 5 | 4 |
| 6 | 1 |
| 7 | 2 |
| 8 | 3 |
| 9 | 4 |
| 10 | 2 |

FIG. 1

SYSTEM, COMPUTER PROGRAM PRODUCT AND METHOD OF SELECTING SECTORS OF A HARD DISK ON WHICH TO PERFORM A VIRUS SCAN

BACKGROUND OF THE INVENTION

1. Technical Field

The present invention is directed to virus scans. More specifically, the present invention is directed to a system, computer program product and method of selecting sectors of a hard disk on which to perform a virus scan.

2. Description of Related Art

A computer virus is a program designed to install itself on a computer system without a user's permission or knowledge. The virus may attach itself to files, boot sectors of hard or floppy disks and/or other storage media and replicates itself, thus continuing to spread. In addition to replicating themselves, some viruses may also cause serious damage to an infected system and/or may negatively affect program and system performance.

To prevent viruses from entering a computer system, a user may either operate the computer system in a bubble (i.e., disconnect the computer system from all networks as well as remove or stop using all disk drives attached to the system), which is unfeasible in today's world, or use an anti-virus program. An anti-virus program is a program that checks or scans all data that is to be used by the computer system or stored on the computer system for viruses. If it finds that the data being scanned is infected by a virus, it may delete or quarantine the data.

Anti-virus programs conceptually reside between application programs and a computer's file system. This allows data that is requested by or is to be used by an application program to be scanned for viruses before it is actually used or stored in the file system. Some anti-virus programs may operate in real-time (i.e., they scan data for viruses at the time the data is to be used). Others may operate just before data is to be stored in the file system.

In either case, however, virus infected data may be stored in the file system. For example, if a computer system is updated when a virus scanner, especially a real-time virus scanner, is inactive (e.g., through safe-mode boots, booting from a CD, booting into a different OS, temporarily disabling a virus scan etc.), there may be virus-infected data stored in the file system. In such a case, the anti-virus program must ensure that the viruses are not executed or copied to other computers. Therefore, the anti-virus program must periodically scan the hard disk (i.e., the file system) of the computer system on which it is installed for infected data.

Performing a virus scan on a hard disk that may contain gigabits of data can be a rather resource-intensive (CPU and disk I/O) as well as time-consuming task. Therefore, instead of performing a virus scan on all data on a hard disk, a need exists for a system, computer program product and method of selecting sectors of a hard disk on which to perform the virus scan.

SUMMARY OF THE INVENTION

The present invention provides a system, computer program product and method of selecting sectors of a disk on which to perform a virus scan. Initially, all data in all sectors of a disk is scanned for viruses. After the initial scan each sector into which new or modified data is written is recorded. This allows only new or modified data that has been added to the disk since a preceding virus scan to be scanned for viruses at a succeeding scan.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 represents an exemplary display of a log file.

DETAILED DESCRIPTION OF THE PREFERRED EMBODIMENT

Figure 2:
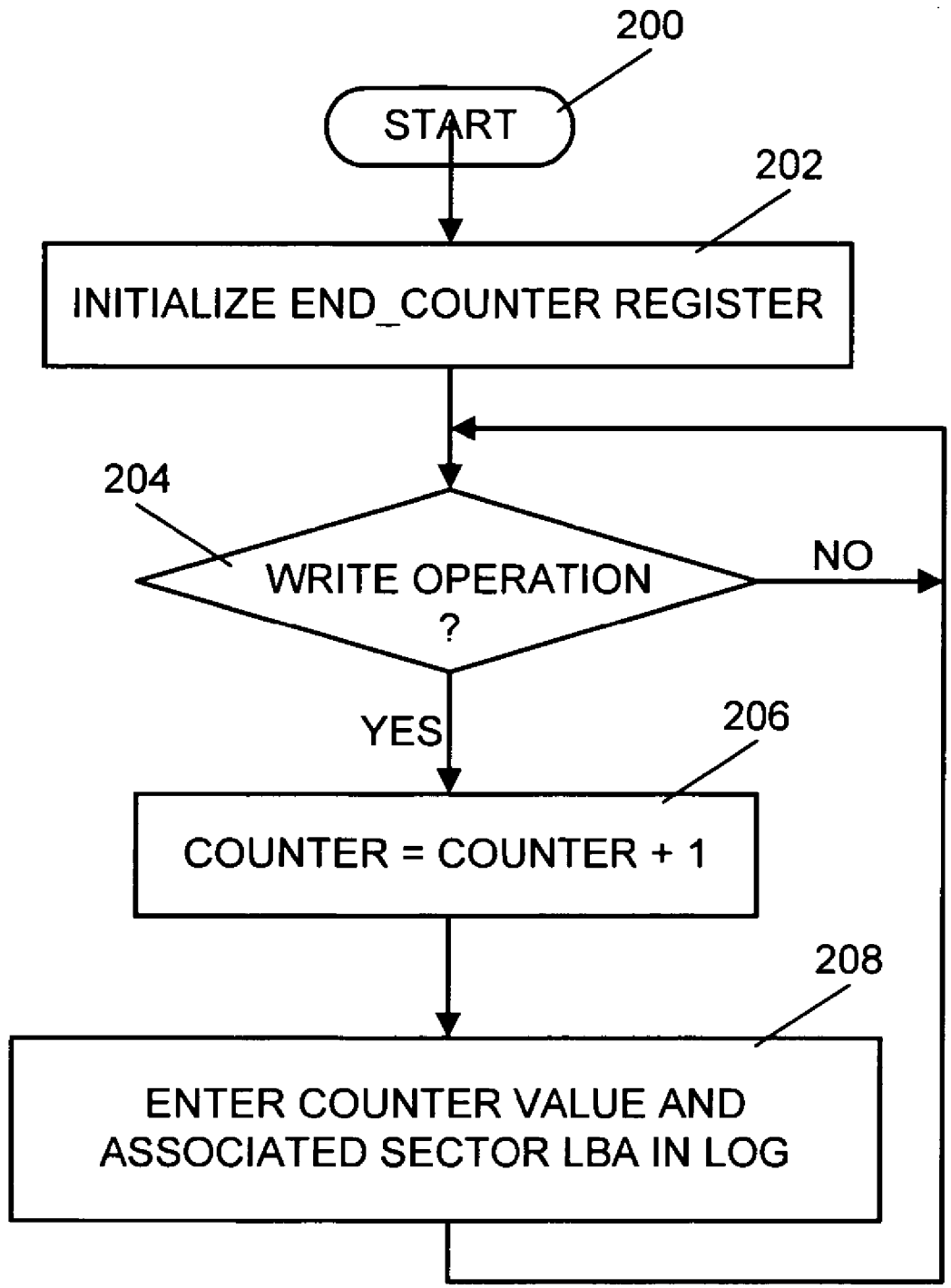
FIG. 2 is a flowchart of a process that may be used to set up the log for a virus scan.

The present invention provides a system, computer program product and method of selecting sectors of a hard disk on which to perform a virus scan. Generally, after all data in a particular sector of a hard disk has been scanned and the sector has been purged of any virus-infected data, a virus scan need not be performed again on data in that sector unless existing data in the sector has been modified or new data has been stored in the sector, or if there is reason to believe that a previously unidentified virus could be present in the sector. Therefore, if all previously scanned sectors of a hard disk can be determined and the location of modified and/or new data on the disk can also be determined, then, only the sectors into which data has been written since a previous virus scan need to be scanned in a successive virus scan. (Note, however, that during the initial virus scan, data in all sectors of the disk will be scanned for viruses. It is only after the initial scan has been performed does it become safe to do incremental scans).

To implement the invention, any existing mechanism (i.e. device drivers, software embedded in hard-drive controller hardware etc.) that may be used to monitor device input/output (I/O) at an appropriate level (e.g., at the device driver level) may be employed. In addition, a counter or clock or any mechanism that can produce a unique incrementing value may also be used. Further, a secure log (i.e., a log that is not susceptible to random updates or a log that may only be updated according to the algorithms described herein) and a logger may also be used. Note, however, that information may be read from the log at any time, but only controlled updates may be made to the log. The log and logger may be built into the disk firmware, and any available storage media may be used including portions of the disk, reserved for this purpose.

The log may be used to keep track of [counter, location] entries. Particularly, each time a write operation is performed, the monitoring mechanism may capture the location where the data is to be written on the disk and send the information to the logger. The logger may then enter the current value of the counter and the location where the data is written on the disk in the log. The counter may be incremented on a regular basis (e.g., every 10 minutes) or at each entry into the log. In the present example, the counter is incremented for each log entry. For security reasons, the counter may never be decremented nor may it ever be reset.

A temporary end_counter register may also be set to the value of the current counter value at the beginning of a virus scan. A persistent begin_counter register may also be used to store a previous counter value. After each virus scan is completed, the current value of the end_counter will be stored in the begin_counter register (i.e., both the begin_counter and the end_counter registers will have the same counter value). Again for security reasons, the begin_counter register may only be set to the end_counter register value after the last virus scan is completed. Thus, during a regular periodic virus scan, only data that is stored in sectors that fall between the sector that is associated with the value in the begin_counter register and the value in the end_counter register will be analyzed.

For example, in FIG. 1, which represents an exemplary display of the log, there are ten (10) log entries. Each log entry has a counter value entry and an associated location on disk entry. Arrows 102 and 104 point to counter values that are in the begin_counter register and the end_counter register, respectively, at the beginning of a virus scan. Based on the value in the begin_counter register, it can be surmised that the last virus scan occurred at log entry four (4). At that point, the begin_counter register has the counter value in log entry four (4) representing the point at which the previous virus scan completed. Note that there have been six (6) write operations performed since the last virus scan. As mentioned before, since the end_counter register always has the last counter value at the time the virus scan begins, it will now have the counter value in the tenth entry in the log.

If a periodic virus scan is to be performed at this moment in time, only the data that has been stored in the sectors that correspond with counter entries that fall between the counter values in the begin_counter register and the end_counter register (e.g., between log entries 5 and 10, inclusively) will be scanned for virus infection. After the virus scan is performed, counter value 10 will be stored in the begin_counter register. At that time, therefore, both registers will contain the same counter value (i.e., counter value 10).

To keep the log at a manageable size, a compression algorithm, either lossy or lossless, may be used. In addition, the log may be implemented as a table of 32-bit counters, indexed by sectors where for 1 k sector-sizes there would be a table size of 4 k per 1 Mbytes of disk size, 4 Mbytes per 1 GBytes or 400 Mbytes per 100 Gbytes. Further, to improve performance, a combination of logging mechanisms may be used. For example, a primary log may be a table of counters whereas a secondary log may be lossy and in counter order, or sector order or other combinations. Further a pass-through hardware device that may sit in front of the hard drive, or the hard drive controller may be used. The hardware device may monitor bus traffic, picking up I/O related accesses and thus may track all I/O on internal hard drives and would function in all modes of operation.

To obtain relevant information from the log, certain commands may be used. For example, a getcounter( ) command may return the current value of the counter. An isLogged (counter, NULL) command may return "true" if the current value of the counter≧the value of counter passed in the command. A getLog(beginCounter, endCounter) command may return a list of all sectors associated with counter values between the counter values passed in the command. A getOldestCounter( ) may return the counter value from the oldest log entry.

The above description makes use of registers (i.e., a begin_counter register and an end_counter register) to hold counter values; however, the invention is not thus restricted. That is, any other resources may be used. For example, data files, registries etc. may be used instead of registers. Thus, the registers are not absolutely needed but are instead used for illustrative purposes only.

FIG. 2 is a flowchart of a process that may be used to maintain the log, for a virus scan, during the normal operation of the computer system. The process starts when the invention is installed (step 200); for software solutions this is when the software is installed, for solutions embedded in disk hardware, this is when the hardware is manufactured. In step 202, the end_counter register is initialized to zero (0). This is the first and ever time that the counter will be set to zero. After installation, the invention is in effect operational and a disk access may occur. The process is then only interested in write operations, anything else will be ignored. When a write operation is effectuated, the value of the counter will be incremented by one (steps 204 and 206) and an entry will be made into the log (step 208). The entry will consist of a counter value and an associated location on the disk where the data is written. After making the log entry, the process may jump back to step 204.

Figure 3:
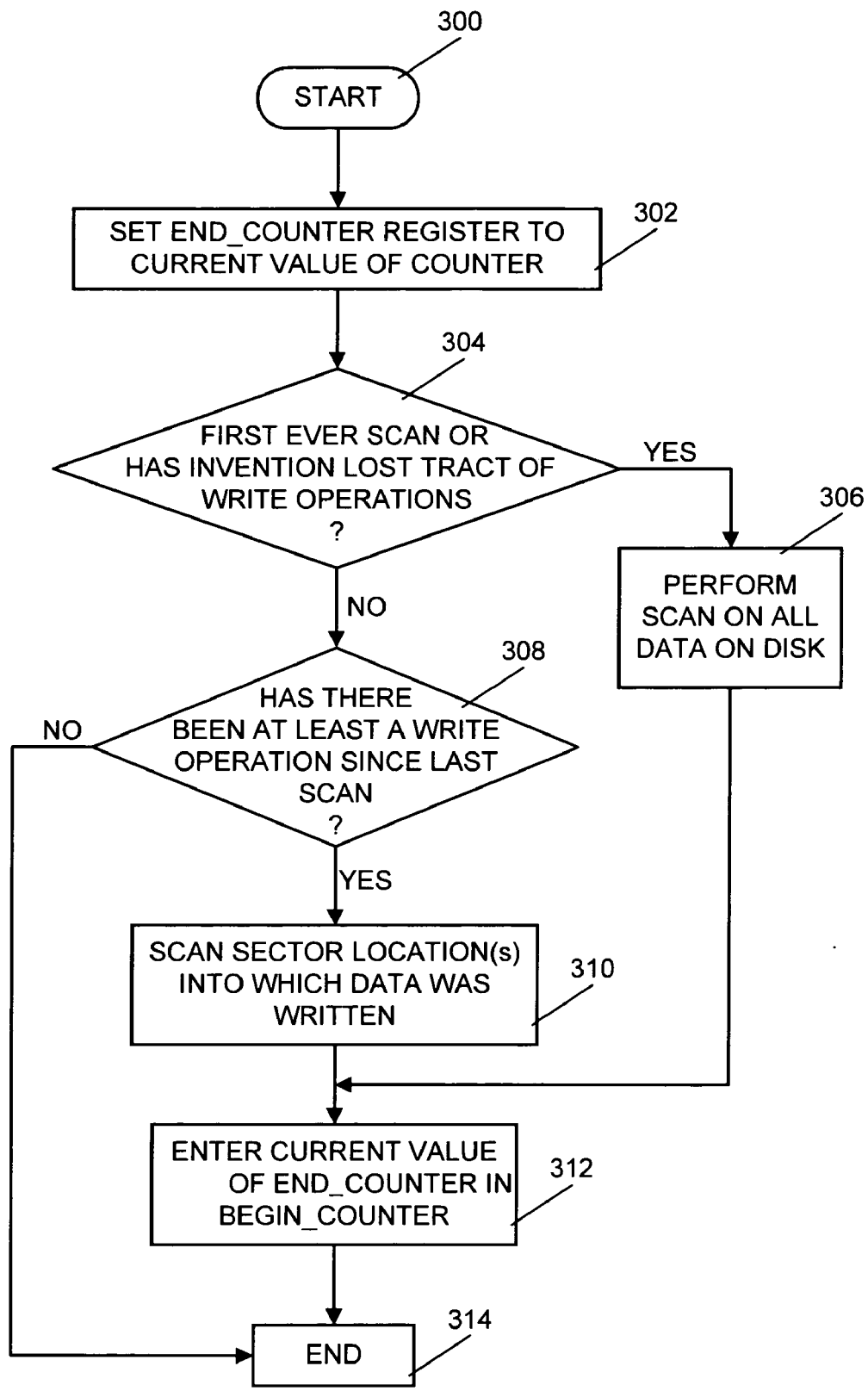
FIG. 3 is a flowchart of a process that may be used during a virus scan.

FIG. 3 is a flowchart of a process that may be used to perform a virus scan according to the present invention. The process starts when a virus scan is to be performed (step 300). At that time, the end_counter register is set to the current value of the counter (step 302). In step 304, a check is made to determine whether the scan is the first ever scan (using the invention) that is to be performed on the disk or whether the invention has lost track of previous write operations (e.g., if begin_counter register value≧counter value after a write operation has been performed). If the answer is positive for any one of the checks, then all the data on the disk is scanned for viruses (step 306) and the process may jump to step 312.

Note that executable files, macro files etc. may be considered as interesting files. Note further that compressed/zipped files may need to be uncompressed/unzipped for the analysis. Note also that a plurality of sectors that makes up a file may be grouped together before the analysis is undertaken. In such cases, a pre-analysis of the sectors/files may have to occur. The pre-analysis may consist of scanning the file system for interesting files and of locating the sectors in which the different parts of the interesting files are placed. In this case, a virus scan may occur on each located sector that is associated with a counter value for which the command isLogged(beginCounter, SectorAddress) returns "false" (i.e., if the counter value associated with the located sector is greater than counter value in begincounter).

In any event, if the answer to the checks in step 304 is negative, then another check is performed to determine whether there have been log entries made beyond the last recorded value of begin_counter; such entries correspond to write operations since the last virus scan (step 308). If there has not been a write operation since the last virus scan, then the process ends (step 314). If there has been at least one write operation, then the data that has been placed in the sector or sectors between the counter values in the begin_counter and the end_counter registers will be scanned for viruses (step 310). After the scan is completed, the current value of the end_counter will be stored in the begin_counter register (step 312) before the process ends (step 314).

Note that in certain cases, a virus definition file may contain safe dates for new viruses (i.e., a date prior to which it is known that a particular virus did not exist). In such cases, the log may contain an additional column for a date entry, or a separate table may be kept to correlate the smallest known counter value for a particular date. That is, each time a write operation is detected, the log and/or other tables will be updated with counter, sector address, and date information.

Hence, a minimal set of previously examined sectors may be re-examined for new viruses in accordance with the date a sector entry was recorded, and in accordance with some understanding of the date before which it is known that the virus did not exist.

Figure 4:
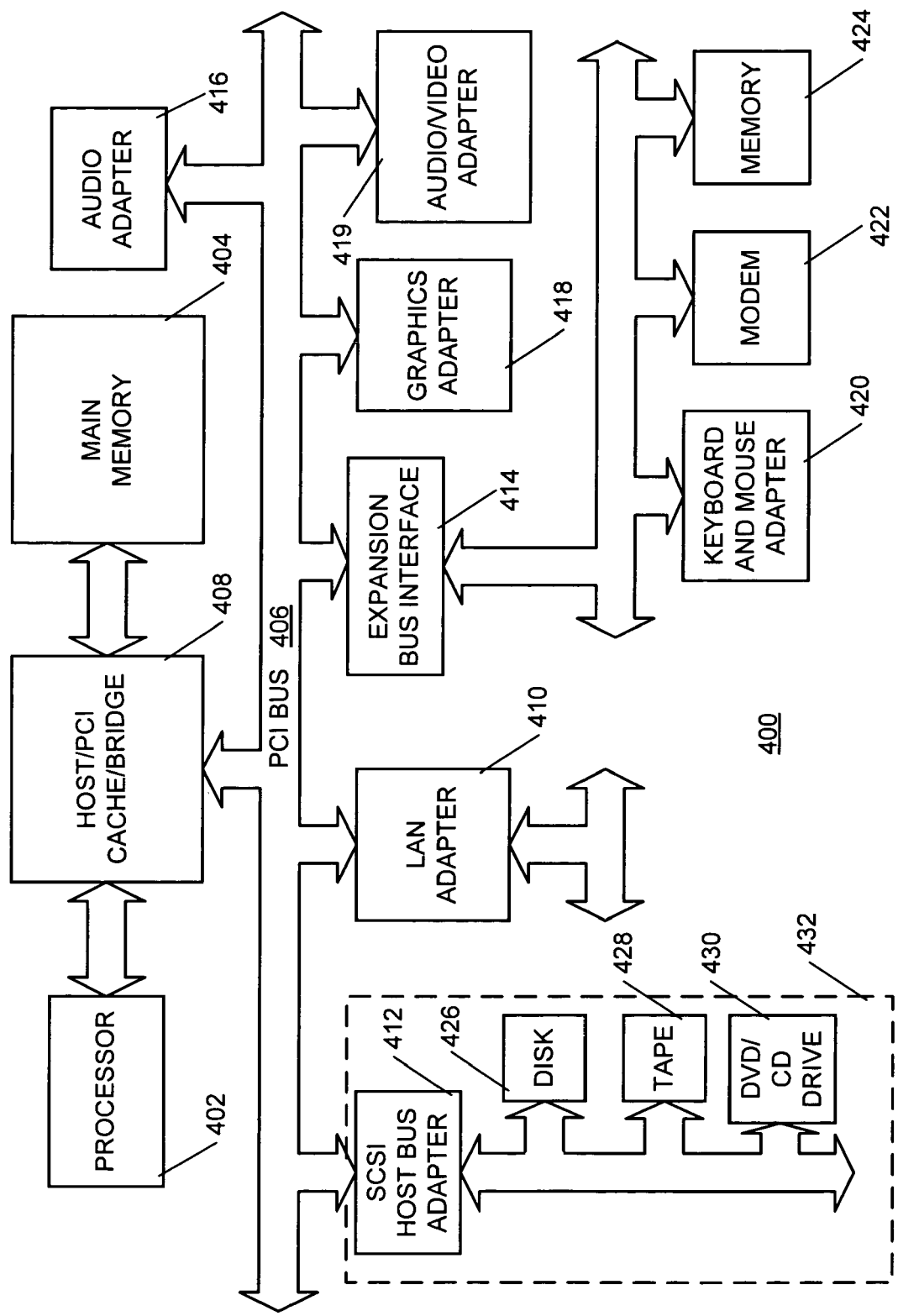
FIG. 4 is an exemplary block diagram of a client apparatus according to the present invention.

With reference now to FIG. 4, a block diagram illustrating a data processing system is depicted in which the present invention may be implemented. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. Small computer system interface (SCSI) host bus adapter 412 provides a connection for hard disk drive 426, tape drive 428, and CD-ROM/DVD drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows XP™, which is available from Microsoft Corporation. An object oriented programming system such as Java may run in conjunction with the operating system and provide calls to the operating system from Java programs or applications executing on data processing system 400. "Java" is a trademark of Sun Microsystems, Inc. Instructions for the operating system, the object-oriented operating system, and applications or programs including the present invention are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

As another example, data processing system 400 may be a stand-alone system configured to be bootable without relying on some type of network communication interface, whether or not data processing system 400 comprises some type of network communication interface. As a further example, data processing system 400 may be a Personal Digital Assistant (PDA) device, which is configured with ROM and/or flash ROM in order to provide non-volatile memory for storing operating system files and/or user-generated data.

The depicted example in FIG. 4 and above-described examples are not meant to imply architectural limitations. For example, data processing system 400 may also be a notebook computer or hand held computer in addition to taking the form of a PDA. Data processing system 400 also may be a kiosk or a Web appliance.

The description of the present invention has been presented for purposes of illustration and description, and is not intended to be exhaustive or limited to the invention in the form disclosed. Many modifications and variations will be apparent to those of ordinary skill in the art. Thus, the embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing virus scans comprising:
   determining, using a virus definition file, newly-known viruses from previously-known viruses, the virus definition file having a list of viruses correlated each to an existence date, a newly-known virus being a virus for which a scan was not performed during a previous virus scan of a disk and a previously-known virus being a virus for which a scan was performed during the previous virus scan of the disk, an existence date being a date on which a correlated virus is known to become in existence;
   determining sectors of the disk in which data has been placed since an existence date of a correlated newly-known virus; and
   scanning the data in the determined sectors for the newly-known virus.

2. The method of claim 1 wherein scanning the data in the determined sectors for the newly-known virus includes scanning all data in all sectors of the disk for the newly-known virus.

3. The method of claim 2 wherein each sector into which new or modified data has been placed since scanning the data in the sectors is recorded in a file in a sequence in which the new or modified data is placed on the disk.

4. The method of claim 3 wherein the last recorded sector is tagged for identification after each virus scan.

5. The method of claim 4 wherein each sector into which new or modified data has been placed along with a date on which the new or modified data has been placed in the sector is recorded in the file.

6. The method of claim 5 wherein the disk is analyzed for interesting files in order to determine sectors in which the interesting files are stored on the disk and to virus scan the determined sectors, the interesting files including executable files and macro files.

7. A computer program product on a computer readable storage medium for performing virus scans comprising:
   code means for determining, using a virus definition file, newly-known viruses from previously-known viruses, the virus definition file having a list of viruses correlated each to an existence date, a newly-known virus being a virus for which a scan was not performed during a previous virus scan of a disk and a previously-known virus being a virus for which a scan was performed during the previous virus scan of the disk, an existence date being a date on which a correlated virus is known to become in existence;
   code means for determining sectors of the disk in which data has been placed since an existence date of a correlated newly-known virus; and
   code means for scanning the data in the determined sectors for the newly-known virus.

8. The computer program product of claim 7 wherein scanning the data in the determined sectors for the newly-known virus includes code means for:
  scanning all data in all sectors of the disk for the newly-known virus.

9. The computer program product of claim 8 wherein each sector into which new or modified data has been placed since scanning the data in the sectors is recorded in a file in a sequence in which the new or modified data is placed on the disk.

10. The computer program product of claim 9 wherein the last recorded sector is tagged for identification after each virus scan.

11. The computer program product of claim 10 wherein each sector into which new or modified data has been placed along with a date on which the new or modified data has been placed in the sector is recorded in the file.

12. The computer program product of claim 11 wherein the disk is analyzed for interesting files in order to determine sectors in which the interesting files are stored on the disk and to virus scan the determined sectors, the interesting files including executable files and macro files.

13. A system for performing virus scans comprising:
  at least one storage device for storing code data; and
  at least one processor for processing the code data to determine, using a virus definition file, newly-known viruses from previously-known viruses, the virus definition file having a list of viruses correlated each to an existence date, a newly-known virus being a virus for which a scan was not performed during a previous virus scan of a disk and a previously-known virus being a virus for which a scan was performed during the previous virus scan of the disk, an existence date being a date on which a correlated virus is known to become in existence, to determine sectors of the disk in which data has been placed since an existence date of a correlated newly-known virus, and to scan the data in the determined sectors for the newly-known virus.

14. The system of claim 13 wherein the code data is further processed to scan all data in all sectors of the disk for the newly-known virus.

15. The system of claim 14 wherein each sector into which new or modified data has been placed since scanning the data in the sectors is recorded in a file in a sequence in which the new or modified data is placed on the disk.

16. The system of claim 15 wherein the last recorded sector is tagged for identification after each virus scan.

17. The system of claim 16 wherein each sector into which new or modified data has been placed along with a date on which the new or modified data has been placed in the sector is recorded in the file.

18. The system of claim 17 wherein the disk is analyzed for interesting files in order to determine sectors in which the interesting files are stored on the disk and to virus scan the determined sectors, the interesting files including executable files and macro files.

* * * * *